Sept. 23, 1969 R. P. MacCOON 3,468,188
HAND ENGAGEABLE PLASTIC COATED PART
Filed July 26, 1967
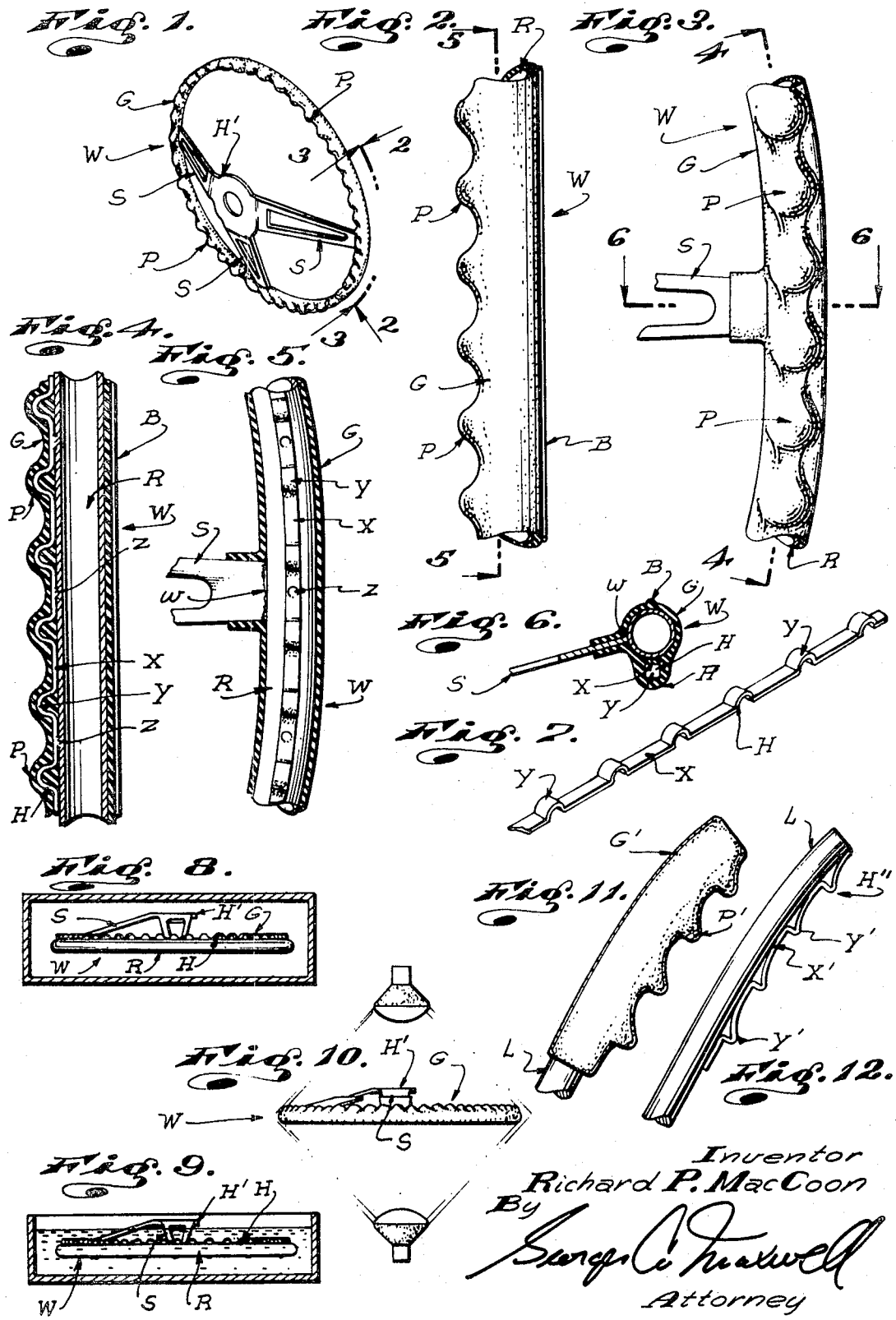
Inventor
Richard P. MacCoon
By
Attorney

United States Patent Office 3,468,188
Patented Sept. 23, 1969

3,468,188
HAND ENGAGEABLE PLASTIC COATED PART
Richard P. MacCoon, c/o Grant Industries, 241 N. Westmoreland, Los Angeles, Calif. 90004
Filed July 26, 1967, Ser. No. 656,275
Int. Cl. G05g *1/10;* B62d *1/04*
U.S. Cl. 74—552                                 8 Claims

ABSTRACT OF THE DISCLOSURE

A hand engageable part such as a steering wheel rim having an elongate metal core cylindrical in cross-section, an elongate heat-sink metal strip fixed to and extending longitudinally along one side of the core and having a plurality of longitudinally spaced portions projecting radially outward from said side of the core and a hot-dip coating of polyvinyl chloride on and about said core and heat sink, said coating, by virtue of the heat sink, being substantially ovoid in cross-section with its major cross-sectional axis intersecting said one side of the core and having a plurality of longitudinally spaced, radially, outwardly-projecting, substantially semi-ovoid, finger-engaging protuberances adjacent said one side of the core.

---

Throughout the mechanical and industrial arts hand engageable levers and wheels are commonly employed to facilitate manual operation and/or manipulation of machines and devices. It is common practice to provide such levers and wheels with grips, that is, coatings, jackets, sleeves or other structure to make the levers and wheels more comfortable and convenient to grip in one's hands. Further, it is common practice to provide rows of spaced projections on or depressions in such jackets, sleeves and the like, between which a person's fingers can engage and rest to provide increased comfort and also to facilitate the obtaining of a better and more positive purchase of the levers or wheels in one's hands.

The most economical form or grip for wheels and levers presently being produced is that form of grip established of polyvinyl chloride applied to the levers or wheels by hot dipping process, which process is well known in the art. The only difficulty with such grips, which are best defined as dip-coated grips, resides in the inability to provide them with spaced, finger-engaging protuberances since the dip-coating of plastic will only take or assume the general configuration of the object coated.

In order to provide dip-coated grips with finger-engaging protuberances, following known techniques, is to establish the basic lever or wheel structure with such protuberances and so that the resulting coating will assume the desired configuration. To follow such a procedure is generally more costly than the costly technique of making molds of desired configuration and molding the grips of plastic on and about the levers and the wheels.

In the case of levers, separate molded sleeve-like grips, with finger-engaging protuberances and commonly referred to as "handle grips" are used to a great extent, but such handle grips are subject to displacement, as well as other shortcomings, and are considerably more costly than hot-dipped plastic grips.

It is to be noted that such preformed handle grips cannot be advantageously provided for and applied to hand-engageable wheels.

An object of the present invention is to provide a novel grip construction for hand engageable levers and wheels.

It is a further object of my invention to provide a hot dipped polyvinyl chloride hand grip structure for levers and wheels having finger-engaging protuberances.

Yet another object of the present invention is to provide a plastic hand grip structure with finger-engaging protuberances which is extremely easy and economical to produce and apply to a related lever or wheel and which results in a finished lever or wheel construction which is considerably less costly than similar constructions established by known plastic molding and forming processes and/or methods.

The foregoing and other objects and features of my invention will be fully understood from the following detailed description of typical preferred forms and applications of my invention, throughout which description reference is made to the accompanying drawings, in which:

FIG. 1 is a perspective view of a steering wheel made in accordance with the present invention;

FIG. 2 is a view of a portion of the structure shown in FIG. 1 and taken as indicated by line 2—2 on FIG. 1;

FIG. 3 is a view taken as indicated by line 3—3 on FIG. 1;

FIG. 4 is a sectional view taken as indicated by line 4—4 on FIG. 3;

FIG. 5 is a sectional view taken as indicated by line 5—5 on FIG. 2;

FIG. 6 is a sectional view taken as indicated by line 6—6 on FIG. 3;

FIG. 7 is an isometric view of a part of my new grip construction;

FIGS. 8, 9, and 10 illustrate the method of dip coating employed to establish my new construction;

FIG. 11 is a view showing a hand lever with my new grip construction; and

FIG. 12 is a view showing the construction in FIG. 11 partially completed.

The instant invention has to do with a hand engageable plastic coated part such as a steering wheel W, as illustrated in FIGS. 1 through 10 of the drawings, or a hand lever L, as illustrated in FIGS. 11 and 12 of the drawings.

The steering wheel W involves a central hub H with a plurality of substantially radially, outwardly projecting spokes S and an annular rim R concentric with the hub and surrounding and fixed to the outer ends of the spokes S.

The hub H and spokes S can be formed integrally from metal plate stock and the rim R can be established of rod or tube stock, cylindrical in cross-section, bent to establish a ring and having its ends fixed together as by welding (not shown).

In the case illustrated, the rim is established of tube stock so as to provide a desired cross-sectional diametric extent with minimum weight and resulting cost of material.

The ends of the spokes S about the inner peripheral portion of the rim R are fixed thereto by welding *w*.

The wheel structure thus far described is a typical hand or steering wheel construction and can, if desired, be used without further change or modification, or can, if desired and as is common practice in the case of automotive steering wheels, be provided with a suitable grip structure G about the rim R.

In accordance with present-day practices, a grip structure for wheels of the general character referred to, that is, wheels having metal rims formed of cylindrical rod or tube stock, consists of a coating of a suitable plastic material, such as polyvinyl chloride, applied to the rim by the so-called "hot dipping" process; or consists of a body of a suitable plastic established and formed about the rim by a suitable molding process.

In the case of "hot dipping," the resulting gripping structure is a simple jacket or coating of plastic, of suitable or desired thickness and shore hardness. It follows the general form or configuration of the rim and, therefore, has limited esthetic and utilitarian attributes. Such a gripping structure has the extremely significant feature of being extremely economical to manufacture, and is particularly suitable for short runs production.

In the case of the molded gripping structure, the exterior configuration of the structure can be controlled to enhance the esthetic and utilitarian attributes of the resulting or finished wheel. The single most significant enhancement is the provision of finger-engaging protuberances. This form of gripping structure is, however, much more costly to produce than "hot dip" gripping means, as it requires the provision and use of extending costly dies or molds and related molding equipment.

It is to be noted that for maximum comfort and for utilitarian purposes, the rim portion of a steering wheel, and other like hand wheel structures, should not be perfectly round in cross-section, but should be ovoid, with the major cross-sectional axis of the rim extending parallel with the axis of the wheel, and the rear side of the wheel, that is, that side of the wheel disposed axially away from that side of the wheel at which the operator of the wheel positions himself or from which the wheel is reached by the operator and which is referred to as the front side of the wheel, should be provided with an annular row of circumferentially spaced, axially rearwardly projecting finger-engaging protuberances.

Since standard rod or tube stock which can be employed to establish wheel rims is cylindrical in cross-section and since the provision of such stock having a desired ovoid cross-section would be economically infeasible, the rims of wheels with hot dip gripping structure are simply cylindrical in cross-section.

The hand gripping structure G provided by this invention includes an elongate metal forming strip which can best be defined as a heat sink strip H, arranged adjacent and extending circumferentially about the rear side of the wheel rim R. The heat sink strip H is preferably established of ribbon stock and has a plurality of substantially flat, straight, longitudinally spaced primary portions which occur in flat bearing engagement with the rear side of the wheel and extend substantially parallel with the central cross-sectional axis of the rim and rearwardly projecting secondary portions Y between and integrally joined with the primary portions.

The secondary portions Y are established in the strip by a suitable bending or forming operation and, in practice, can be varied widely in shape and in size or extent.

In the preferred carrying out of the invention and as illustrated in FIGS. 4 through 7 of the drawings, the secondary portions Y of the heat sink strip H are simple, substantially U-shaped, forwardly opening, rearwardly extending projections formed in the ribbon stock at longitudinally spaced points as clearly illustrated in FIG. 7 of the drawings.

The strip H can be co-extensive with the circumferential extent of the rear side of the rim and can be established of a single length or piece of formed strip stock; can be made up of several lengths of such stock arranged about the rim in end to end relationship, or can be made up of one or more lengths or pieces of strip stock of limited longitudinal extent and arranged adjacent and about predetermined portions of the wheel rim, without departing from the spirit of the invention.

The strip or strips H are suitably secured to the rim R. In practice, the strip or strips can be fixed to the rim by rivets, screw fasteners, a suitable cement, welding or, preferably and as illustrated, by spot welding as indicated at Z.

Finally, and in addition to the foregoing, the grip structure G that I provide includes a jacket or coating of polyvinyl chloride about the rim R and heat sink H, which coating is applied by hot dipping, that is, by that method of plastic coating which involves first, heating the structure to be coated, as by placing it in an oven, as illustrated in FIG. 8 of the drawings; second, dipping the heated structure in a plastisol, as illustrated in FIG. 9 of the drawings, and withdrawing it from the bath at a substantial uniform rate of speed, proportionate to the rate of gelation and so that a gel coating of plastic of predetermined thickness is established about the structure, and, finally, fusing and/or curing the coating in an oven or by means of infrared heat lamps, as indicated in FIG. 10 of the drawings.

The establishment of a plastic coating of predetermined uniform thickness by hot dipping is controlled by the temperature of the preheated structure in proportion or ratio to the nature and proportion of the solvent in the plastisol and the rate of withdrawal of the structure from the plastisol bath. The heated structure transfers heat to the plastisol evaporating the solvent, causing temporary increase in fluidity, and then gelation. The layer of plastisol next to the structure passes through a viscosity change and to gelation very quickly, whereas the layers of plastisol further from the heated surface will take longer to gel. At some distance from the heated surface, a layer of plastisol will be reduced in viscosity, but will not arrive at the gelatin temperature. This layer and the layers further away will drain from the structure, leaving a gelled coating, which, as pointed out above, can be fused by subsequent application of heat.

By withdrawing the structure from the plastisol bath at a predetermined rate, the distance of heat penetration or transfer from the heated structure, into the plastisol with resulting gelation can be controlled, thereby controlling the thickness of the resulting coating.

Normally, in carrying out such a method, as the plastisol drains from the jelled coating, upon withdrawal of the structure from the bath, a slight sag develops at the lowermost edge of the structure. In the instant case, the wheel structure is dipped with its front side down, so that upon withdrawal from the bath, the resulting sag is on the front side of the wheel rim and takes the form of an ornamental bead, as indicated at B, on the finished product.

It will be apparent that when the wheel is hot dipped in the manner set forth above, the plastisol initially jells about the exterior surfaces of the rim R and the exposed surfaces of the heat sink strip H and continues to build up to fill the voids, cracks, and corners about the strip H and between the portions Y of the strip and the rim. The heat sink strip H cooperates with the stock of the adjacent rear portion of the rim to provide a great amount of residual heat in the structure, at the rear side of the wheel and so that the gel at and about the rear portion of the wheel rim builds more rapidly and deeper than the gel at the front side of the rim and results in a coating which is ovoid in cross-section, rather than round.

Further, the plastisol about the projections Y of the strip H jells and builds up so as to establish rearwardly projecting plastic finger-engaging protuberances P in spaced relationship about the rear side of the wheel structure.

It is to be noted that the heat transfer from and between the rim R and the portions X and Y of the strip H, into the plastisol is such that all of the corners and openings present fill with jelled plastisol which results in a smooth and rounded product, free of unsightly and undesirable corners, cavities, pockets and the like.

Since the portions Y of the strip project upwardly during dipping, the plastisol drains down and about the jell about the projections when the structure is removed from bath and with the result that no points or the like are established on the protuberances P. Instead, the protuberances are substantially semi-ovoid protuberances.

The strip H in the finished product is completely obscured and while it presently brings about the desired end configuration of the finished product, the configuration of the strip itself is obscured and hidden.

In the form of the invention shown in FIGS. 11 and 12 of the drawings, the grip structure G' is applied to the terminal end portion of an elongate cylindrical handle or lever arm L.

In such a case, a short length of heat sink strip H″ is fixed to a desired side of the lever arm L, as illustrated in FIG. 12 of the drawings. This assembly is hot dipped in a suitable plastisol in substantially the same manner as in the first form of the invention and so that a plastic jell, which is subsequently curved, is established about the structure, as illustrated in FIG. 11 of the drawings.

In this second form of the invention, the portions X′ and Y′ of the strip H″ are formed somewhat differently from those similar portions of the strip H in the first form of the invention and so that the protuberances P′ of the resulting grip structure G′ are of a different and unique configuration.

While I have specified hot dipping the wheel and lever structures W and L in polyvinyl chloride plastisols, to establish my new grip structure thereon, it is to be understood and it will be apparent that other plastic dipping methods and employing plastics other than polyvinyl chloride could be employed without departing from the spirit of this invention.

Having described only typical preferred forms and applications of my invention, I do not wish to be limited or restricted to the specific details herein set forth, but wish to reserve to myself any modifications and/or variations which may appear to those skilled in the art and which fall within the scope of the following claims.

Having described my invention, I claim:

1. A hand grip structure of the character referred to including an elongate hand engageable part of uniform cross-section, an elongate forming member fixed to and extending longitudinally along one side of said part and having longitudinally extending primary portions adjacent said part and secondary portions between the primary portions and projecting radially outwardly from said one side of said part and a coating of polyvinyl chloride about said part and member, said coating having a smooth, rounded exterior surface substantially uniform in cross-section about the sides of said part remote from said one side of the said part and having substantially concaved, radially outwardly opening finger-receiving depressions at said one side of said part adjacent the primary portions of said member and radially outwardly projecting, substantially ovoid finger-engaging protuberances at said one side of the part adjacent the secondary portions of the member and between said finger-receiving depressions.

2. The structure set forth of claim 1 wherein said part is cylindrical in cross-section and the coating is substantially ovoid in cross-section at all points throughout its longitudinal extent with its major cross-sectional axes intersecting the central longitudinal axes of the part and member.

3. The structure set forth in claim 1 wherein said member is established of strip metal stock, said primary portions being straight portions in the stock and arranged to establish substantially flat bearing engagement on said one side of the part, the secondary portions being portions of the strip stock between the primary portions and bent to project radially outwardly from said one side of the part.

4. A structure as set forth in claim 1 wherein said part is established of metal cylindrical stock and said member is established of flat ribbon metal stock, the major cross-section of which is normal to the plane in which the axes of the part and member lie, said primary portions being straight portions in the stock and arranged to establish substantially flat bearing engagement on said one side of the part, the secondary portions being portions of the ribbon stock between the primary portions and bent in radially inwardly opening U-shaped form to project radially outwardly from said one side of the part.

5. A structure as set forth in claim 1 wherein said part is established of cylindrical metal stock and said member is established of an elongate strip of malleable metal stock, said primary portions being substantially straight portions in the stock arranged in substantially flat bearing engagement on said one side of said part and fixed thereto by welding, the portions of the stock between the primary portions being bent in substantially U-shaped form and defining the secondary portions, said coating being substantially ovoid in cross-section at all points throughout its longitudinal extent with its major axes intersecting the central longitudinal axes of the part and member.

6. The structure set forth in claim 1 wherein said part is an endless rim of a hand wheel fixed to the outer ends of a plurality of spokes projecting radially outwardly from a central hub, said one side of the said part being disposed axially in one direction relative to the central axis of the wheel.

7. The structure set forth in claim 1 wherein said part is an endless circular rim of a hand wheel fixed to the outer ends of a plurality of spokes projecting radially outwardly from a central hub, said one side of the said part being disposed axially in one direction relative to the central axis of the wheel, said member is established of strip metal stock, said primary portions being straight portions in the stock in flat bearing engagement on said side of the part, the secondary portions being portions of the strip stock between the primary portions and bent to project radially outwardly from said one side of the part.

8. The structure set forth in claim 1 wherein said part is an endless rim of a hand wheel established of cylindrical tubular steel and fixed to the outer ends of a plurality of spokes projecting radially outwardly from a central hub, said one side of the said part being disposed axially in one direction relation to the central axis of the wheel, and said member being established of an elongate ribbon of malleable metal stock, said primary portions being substantially straight portions in bearing engagement on said one side of said part and fixed thereto by welding, the portions of the ribbon stock between the primary portions being bent in substantially U-shaped form and defining the secondary portions, said coating being substantially ovoid in cross-section at all points throughout its longitudinal extent with its major cross-sectional axes parallel with the axis of the wheel.

References Cited

UNITED STATES PATENTS

| | | | |
|---|---|---|---|
| 1,777,315 | 10/1930 | Kraft | 74—552 |
| 2,043,584 | 6/1936 | Husted | 74—552 XR |
| 3,319,486 | 5/1967 | Spencer | 74—558 |

FRED C. MATTERN, Jr., Primary Examiner

F. D. SHOEMAKER, Assistant Examiner

U.S. Cl. X.R.

29—159; 74—558